JAMES A. WOODBURY.
Tempering the Treads of Car Wheels.

No. 125,651.   Patented April 9, 1872.

WITNESSES.  
J. D. Kilby  
N. C. Lombard

INVENTOR.  
James A. Woodbury

UNITED STATES PATENT OFFICE.

JAMES A. WOODBURY, OF BOSTON, MASSACHUSETTS.

IMPROVEMENT IN TEMPERING THE TREADS OF CAR-WHEELS.

Specification forming part of Letters Patent No. 125,651, dated April 9, 1872.

Specification describing an Improvement in the Manufacture of Locomotive, Truck, and Car-Wheels, invented by JAMES A. WOODBURY, of Boston, in the county of Suffolk and State of Massachusetts.

My invention relates to an improvement in car and locomotive wheels having steel treads; and it consists of a wheel having a tempered or hardened tread gradually merging into a soft, tough backing, the tempering or hardening being effected by the peculiar process and apparatus fully described hereafter.

Figure 2:
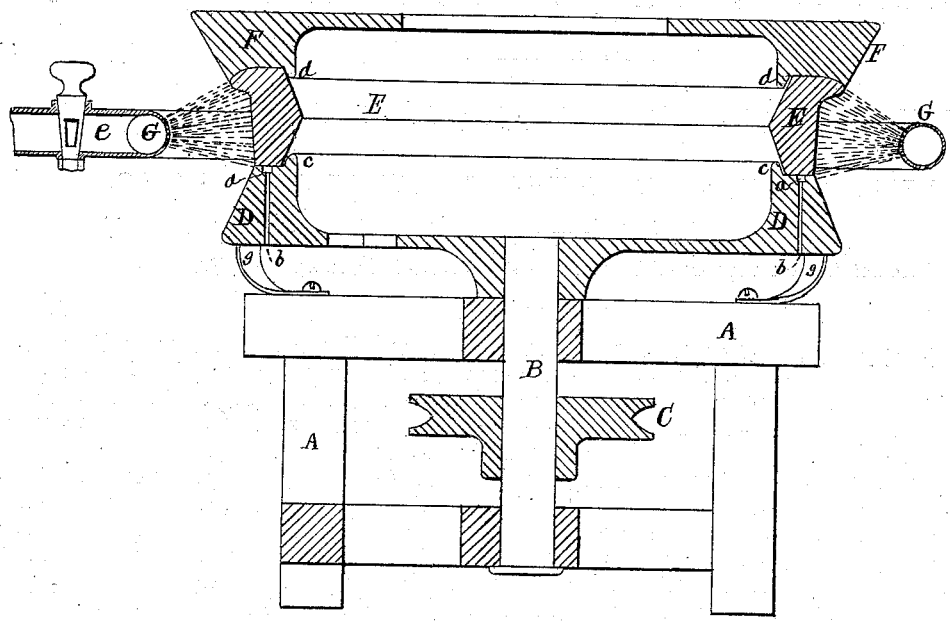
Figure 1:
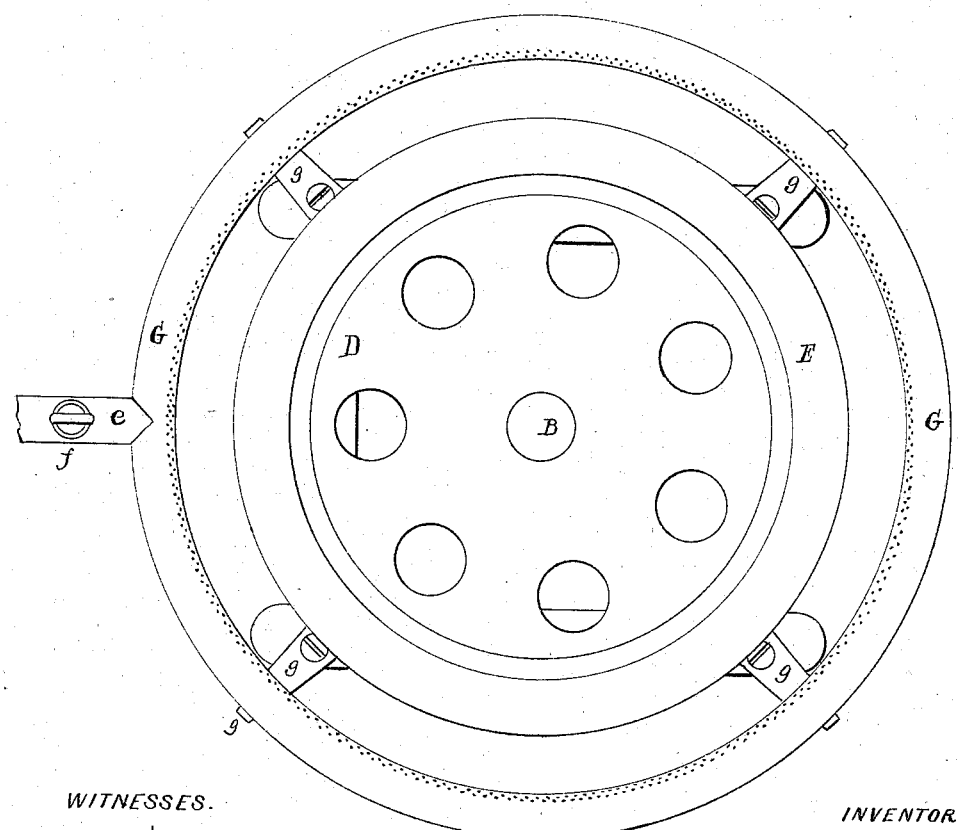

Figure 1 of the drawing is a plan (a portion being removed) of apparatus which I employ in hardening or tempering the treads of wheels or tires; and Fig. 2 is a vertical section of the same on the line $x\,x$. A is a frame, in bearings, on which revolves a vertical shaft, B, provided with a pulley, C. To the upper end of the shaft B is secured a disk, D, which is of about the same diameter as the tire or wheel to be operated on, and on the upper side of the disk is an annular rib, $x$, of such a diameter as to hold the tire or wheel in its proper position concentric with the disk D. In the upper side of the disk D is also a circular groove, $a$, so located as to limit or determine the distance to which the water may come in contact with the wheel or tire, said groove being provided with several outlet or discharge orifices $b$. The wheel or tire E is placed upon the disk D with the flange side upward, and upon the rim is placed a ring or shield, F, a rib, $d$, on the under side of which projects downward within the tire or rim for the purpose of holding the ring in its proper lateral position. The outer diameter of the ring F may be varied to expose more or less of the tread, according to the extent of surface to be hardened or tempered. G is a circular pipe supplied by a branch, $e$, in which is a cock, $f$. This pipe is supported by brackets $g\,g$, secured to the frame, in a position opposite the tread and concentric therewith, and its inner side toward the tread is perforated in such a manner that when the cock $f$ is opened the hardening liquid will be thrown in a series of jets simultaneously upon all parts of the outer face of the tread and flange not protected by the disk or shield D and shield-ring F, the tire or wheel being revolved at the same time to aid in an even distribution of the liquid. The tread should be of steel of such a grade or quality that it will be hardened or take a suitable temper when the water is applied, and the inner portion of the tire or wheel should be tough, strong, and of suitable quality to receive a heavy blow without breaking. The operation of the apparatus and the process of tempering or hardening the tread is as follows: The wheel or tire, having been heated in a suitable furnace to the proper temperature, is placed on the disk D in the position shown, with the shield-ring F on the top of it, and the disk is set in motion by a driving-band passing around the pulley C. The cock F is then opened and the water or other tempering liquid is forced against the hot tread, which is thus hardened, the degree to which the tread is tempered or hardened being increased or diminished by the force or flow of the water, and the length of time for which it is applied. It will be seen that the rim is not hardened or tempered throughout, but that the wearing portion or tread only is hardened to such a depth as may be necessary, the hardened portion gradually merging into a soft, tough backing, so that the laminating or scaling of the hardened portion, which is apt to occur when there is any abrupt change, is prevented. The apparatus which I have shown is arranged to revolve the tire or wheel, while the water is being applied to the same, to insure the even distribution of the hardening liquid, but it is obvious that the revolution of the wheel or tread is not absolutely necessary.

Although I have described and illustrated a process of hardening or tempering the treads by means of fluids, I do not restrict myself thereto, as the same qualities may be imparted to the treads by the application of any substances and compositions heretofore employed for hardening steel.

*Claims.*

1. As an improved article of manufacture, a car-wheel having a hardened-steel tread, gradually merging into a soft-steel backing, as specified.

2. The combination of the shields D and F with the perforated pipe or reservoir G, substantially as described.

Executed at Boston, this 5th day of September, 1871.

JAMES A. WOODBURY.

Witnesses:
J. Q. KILBY,
N. C. LOMBARD.